UNITED STATES PATENT OFFICE.

FRANK RAYMOND, HARRY DUNN, AND CALVIN COLT, OF NASHVILLE, TENN.

IMPROVEMENT IN PACKINGS FOR STEAM-ENGINES.

Specification forming part of Letters Patent No. 128,754, dated July 9, 1872.

*To whom it may concern:*

Be it known that we, FRANK RAYMOND, HARRY DUNN, and CALVIN COLT, of Nashville, in the county of Davidson, State of Tennessee, have invented and discovered a new Material and new and Improved Mode of Preparing a Packing for Journals and other uses for Steam-Engines and other machinery, as well as combining a new and valuable lubricator for the same, car-wheels, or other running-gear; and do declare that the following is a full, clear, and exact description of the same, reference being had to the specimens of the material herewith filed.

Our invention relates to the use of the mineral known as mica or isinglass stone as a packing and lubricator for engines, journals, and machinery generally; and consists in the manner in which the mica or isinglass stone is prepared, and in applying it in its various preparations to the use of a packing and lubricating agency for engines and other machinery.

This mineral—mica or isinglass—can be heated and crumbled to a powder, or taken in its raw state and pulverized. When pulverized, it is mixed with cotton, hemp, or any other similar fibrous substance, and used in lieu of the ordinary packing—with this advantage: there is no danger of fire or heating; it is a non-conductor of heat, and has anti-friction qualities under attrition; and even though the oil is nearly all gone, it will be sure to be equally distributed about the journal, &c.

This mineral, when prepared by pulverizing and mixed with oil or other lubricating substance or ingredient usually used, is a very valuable lubricator for any kind of journal, axle, machinery, &c., having decided advantages over all other classes of lubricators, in consequence of its anti-heating and valuable lubricating qualities.

Having now fully described our invention, or all that is necessary to make our invention known and understood, what we deem and prize as our invention, and desire to protect by Letters Patent, is—

1. The application of the mineral known as mica or isinglass, prepared as described or otherwise, to the use of packing for journals, engines, and other machinery, for the purposes and in the manner set forth and described.

2. The application of the mineral known as mica or isinglass, prepared as set forth or otherwise, as a lubricator for journals, engines, other machinery, and axles, for the purposes and in the manner set forth and described.

3. The discovery of the lubricating and similar qualities in mica or isinglass stone, and the general application of the same to packing and lubricating purposes, set forth and described.

FRANK RAYMOND. [L. S.]
  HARRY DUNN. [L. S.]
  CALVIN COLT. [L. S.]

Witnesses:
 L. J. NOAH,
 J. E. STACEY.